United States Patent [19]

Segawa

[11] Patent Number: 5,060,223
[45] Date of Patent: Oct. 22, 1991

[54] OPTICAL TYPE INFORMATION RECORDING MEDIUM HAVING SPECIFIED PIT AND GUIDE GROOVE SHAPES

[75] Inventor: Hideki Segawa, Sagamihara, Japan

[73] Assignee: Ricoh Company, Ltd., Tokyo, Japan

[21] Appl. No.: 388,569

[22] Filed: Aug. 1, 1989

[30] Foreign Application Priority Data

Aug. 16, 1988 [JP] Japan .................. 63-203377

[51] Int. Cl.$^5$ ............... G11B 5/82; G11B 7/00
[52] U.S. Cl. ............... 369/275.4; 369/109; 369/284; 369/111
[58] Field of Search ............. 369/109, 93, 44.26, 369/94, 111, 275.1, 275.3, 275.4, 284, 51

[56] References Cited

U.S. PATENT DOCUMENTS

| | | | |
|---|---|---|---|
| 3,931,459 | 1/1976 | Korpel | 369/109 |
| 4,230,915 | 10/1980 | Dil et al. | 369/275.4 |
| 4,499,574 | 2/1985 | Braat | 369/275.3 |
| 4,852,076 | 7/1989 | Ohta et al. | 369/275.4 |
| 4,963,464 | 10/1990 | Setani | 369/48 |

FOREIGN PATENT DOCUMENTS 102347 6/1983 Japan .
40342 4/1984 Japan .
168945 11/1984 Japan .
19939 10/1988 Japan .

*Primary Examiner*—Roy N. Envall, Jr.
*Assistant Examiner*—Thang V. Tran
*Attorney, Agent, or Firm*—Cooper & Dunham

[57] ABSTRACT

An optical type information recording medium has guide grooves for tracking formed in a concentric or spiral shape at a predetermined pitch; and a pre-format pit formed approximately midway between the guide grooves in the normal direction thereof and recording at least address information. The optical type information recording medium is constructed such that the predetermined pitch is a value ranged from 1.4 μm to 2.0 μm, and the depth of the pre-format pit is a value ranged from 0.46 λ/n to 0.58 λ/n where n shows the refractive index of a substrate of the medium and λ shows a wavelength of a light source for reading the information recorded to the medium, and the cross-sectional shape of the pre-format pit in the normal direction is provided in a range represented by a first predetermined inequality using a function of the second degree, and the cross-sectional shape of the guide grooves in the normal direction is provided in a range represented by a second predetermined inequality using a function of the second degree.

1 Claim, 2 Drawing Sheets

OPTICAL TYPE INFORMATION RECORDING MEDIUM HAVING SPECIFIED PIT AND GUIDE GROOVE SHAPES

BACKGROUND OF THE INVENTION

The present invention relates to a medium for optically recording information.

The optical type information recording medium such as an optical disk can record and reproduce a large amount of data from a single disk at high density. Therefore, recently, the optical disk has been often used as a recording medium for video or audio information, etc.

In an apparatus using the optical disk, as is well-known, for example, a laser beam is reduced to about 1 μm in diameter and has 1.5 to 2 μm in pitch so that a recording track having a concentric or spiral shape is formed to record a signal and the reproduction is performed by using the laser beam.

The conventional technology relating to cross-sectional shapes of a guide groove for tracking and a pre-format pit for recording address information, etc. is disclosed in Japanese Laid-Open Patent Nos. 58-102347, 59-40342 and 59-168945 and Japanese Published Patent No. 63-19939, etc., for example. However, in the technology disclosed in such patent publications, the shapes of the guide groove, etc. are different from those in a land recording system and the depth of the pit is shallow such as about $(\frac{1}{8})\lambda$ or $0.25\lambda/n$ to $0.29\lambda/n$ nanometers where n is a refractive index of a substrate and $\lambda$ is a wavelength of the laser beam. Further, the shapes of the pit, etc. are represented by angles, gauss distribution, etc., and it is thereby difficult to specify the real shapes thereof.

Therefore, with respect to the optical disk in the land recording system manufactured on the basis of the conventional technology mentioned above, there are some problems such as a disturbance, the reduction in reflectance of the optical disk with the passage of time, a shift in optical axis of the laser beam, the occurrence of the inclination of a surface of the optical disk, etc. Therefore, the tracking error tends to be caused often. In a severe case, the amplitude of a tracking error siganl is reduced to that less than 50% in comparison with a predetermined amplitude so that it is impossible to normally perform a tracking servo control.

SUMMARY OF THE INVENTION

It is therefore a first object of the present invention to provide an optical type information recording medium for stably and reliably performing the tracking operation and improving the reliability of an optical disk system.

A second object of the present invention is to provide an optical type information recording medium for easily judging whether the cross-sectional shape of the optical disk is good or not.

A third object of the present invention is to provide an optical type information recording medium that is easily manufactured.

The above objects of the present invention can be achieved by an optical type information recording medium having guide grooves for tracking formed in a concentric or spiral shape at a predetermined pitch; and a pre-format pit formed approximately midway between the guide grooves in the normal direction thereof and recording at least address information; the optical type information recording medium being constructed such that the predetermined pitch is from 1.4 μm to 2.0 μm, and the depth of the pre-format pit is from $0.46\lambda/n$ to $0.58\lambda/n$ where n is the refractive index of a substrate of the medium and $\lambda$ is the wavelength of a light source for reading the information recorded in the medium, and the cross-sectional shape of the pre-format pit in the normal direction is in a range represented by a first predetermined inequality using a function of the second degree, and the cross-sectional shape of the guide grooves in the normal direction is in a range represented by a second predetermined inequality using a function of the second degree.

More specifically, the above objects of the invention can be achieved in an optical type information recording medium comprising guide grooves for tracking formed in a concentric or spiral shape at a predetermined pitch, pre-format pits formed approximately midway between the guide grooves for recording at least address information, where said predetermined pitch is from 1.4 μm to 2.0 μm, said pre-format pit has a depth from $0.46\lambda/n$ to $0.58\lambda/n$, where n is the refractive index of a substrate of the medium and $\lambda$ is the wavelength of a light source for reading the information recorded in the medium. The pre-format pits have a cross-sectional shape defined by a first inequality, $$F_1(x) \leq y \leq F_2(x)$$

where x and y in said first inequality are coordinates having an origin located at approximately the mid-point between adjacent guide grooves on a substrate face of the medium, $F_1(x)$ is a function representing the cross-sectional shape of the pre-format pit at a maximum depth in a y-direction and $F_2(x)$ is a function representing the cross-sectional shape of the pre-format pit at a minimum depth in the y-direction; and When $y = f_1(x) = (1.5/780)(\lambda/n)((3 \times 10^{-3})x^2 - 400)$, then $F_1(x) = 0$ when $f_1(x) \geq 0$, $F_1(x) = f_1(x)$ when $0 \geq f_1(x) \geq -0.58\lambda/n$, and $F_1(x) = -0.58\lambda/n$ when $-0.58\lambda/n \geq f_1(x)$; but when $y = f_2(x) = (1.5/780)(\lambda/n)((20 \times 10^{-3})x^2 - 350)$, then $F_2(x) = 0$ when $f_2(x) \geq 0$, $F_2(x) = f_2(x)$ when $0 \geq f_2(x) \geq -0.46\lambda/n$, and $F_2(x) = -0.46\lambda/n$ when $-0.46\lambda/n \geq f_2(x)$.

The cross-sectional shape of said guide grooves is defined by a second inequality, $$G_1(x) \leq y \leq G_2(x)$$

where x and y in said second inequality are coordinates the origin of which is at a center of a guide groove on the substrate face of the medium, $G_1(x)$ is a function representing the cross-sectional shape of the guide grooves at a maximum depth in a y-direction, and $G_2(x)$ a function representing the cross-sectional shape of the guide grooves at a minimum depth in the y-direction, and When $y = g_1(x) = (1.5/780)(\lambda/n)((1.5 \times 10^{-3})x^2 - 150)$, then $G_1(x) = 0$ when $g_1(x) \geq 0$, and $G_1(x) = g_1(x)$ when $g_1(x) \leq 0$; and When $y = g_2(x) = (1.5/780)(\lambda/n)((2.5 \times 10^{-3})x^2 - 60)$, then $G_2(x) = 0$ when $g_2(x) \geq 0$ and $G_2(x) = g_2(x)$ when $g_2(x) \leq 0$.

In an optical disk having the guide grooves and the pre-format pit formed on the basis of the above conditions, two divided photodiodes can receive the reflected light of the laser beam requied to obtain an amplitude of the tracking error signal more than 60% with respect to a predetermined amplitude of the tracking error siganl.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical type information recording medium in the present invention will now be described in detail with reference to the accompanying drawings.

Figure 1:
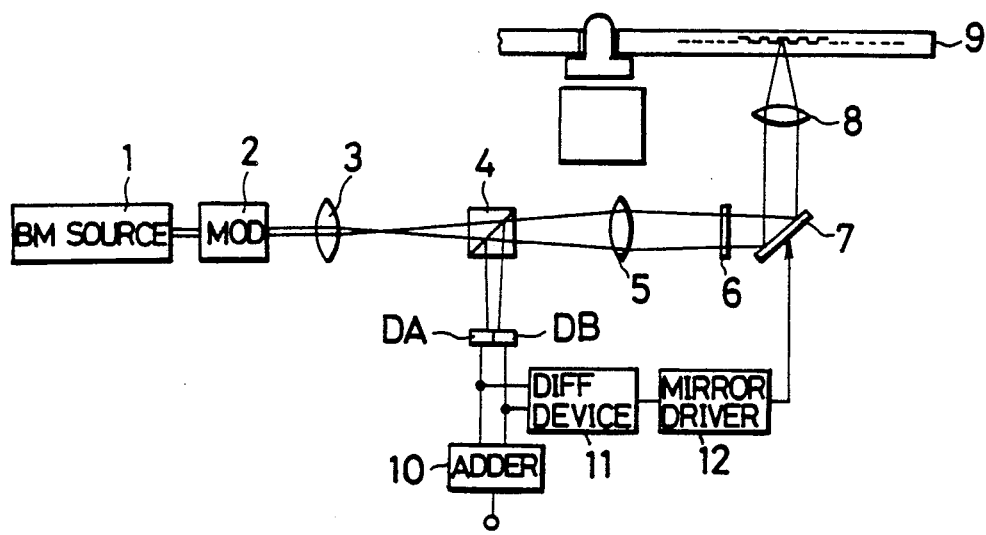
FIG. 1 is a schematic view of a recording-reproducing apparatus for an optical disk.

FIG. 1 shows a general recording-reproducing apparatus. In this apparatus, a laser beam is outputted from laser beam source 1 such as a helium-neon laser or a diode laser for example. The laser beam is then irradiated onto optical disk 9 through modulator 2, lens 3, deflecting beam splitter 4, lens 5, ¼ wavelength plate 6, rotary mirror 7 and objective lens 8. Then, the reflected light from optical disk 9 is read by a photoelectric converting element while the above-mentioned constructional members are moved in the normal direction of rotated optical disk 9.

Figure 2:
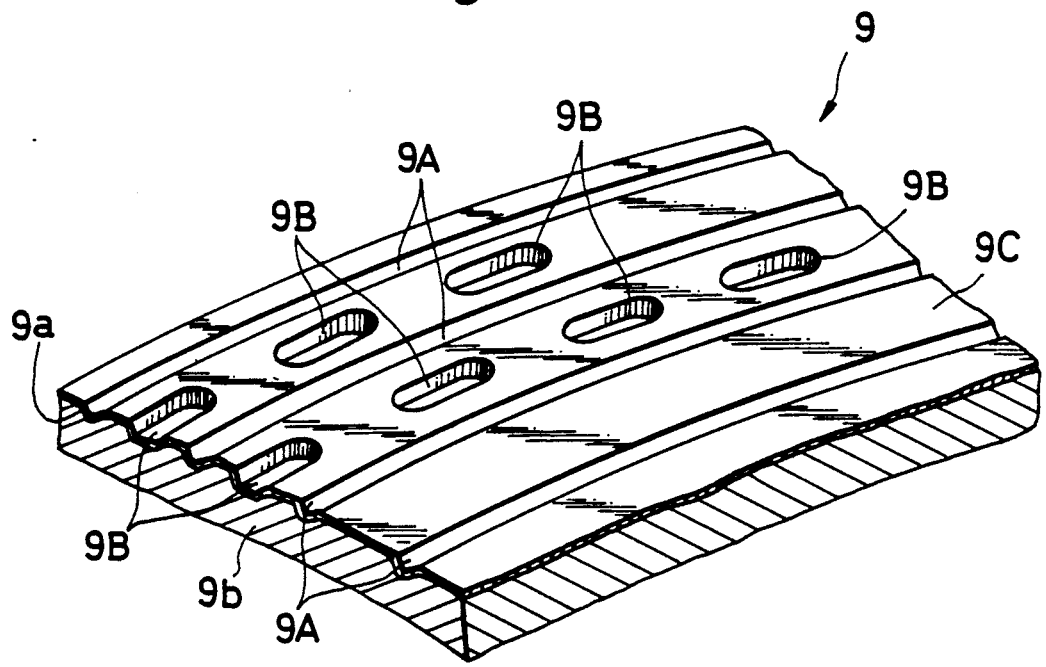
FIG. 2 is a partially enlarged perspective view of the optical disk in the land recording system.

As shown in FIG. 2, in optical disk 9 of a land recording system, as is well-known, guide grooves 9A for tracking are formed in a concentric or spiral shape at a predetermined pitch on substrate 9b for holding recording film 9a made of $TeO_x$, etc. and attached onto the entire upper face of optical disk 9. Pre-format pits 9B for recording address information, etc. are formed approximately midway between guide grooves 9A in the normal direction thereof or in the radial direction of optical disk 9. When a user records data onto such an optical disk 9, the address information in pre-format pits 9B is read by the laser beam tracking guide grooves 9A. Thereafter, power for recording is applied to the laser beam and is turned on and off in a region called data section 9C in which no pre-format pits 9B are formed. Thus, data are written in recording film 9a on this data section 9C. When the data are reproduced, the above information recorded in data section 9C is read by the laser beam. As is clearly seen, in the recording and reproducing operations of optical disk 9, it is necessary to perform a stable and accurate tracking operation of the laser beam, i.e., to irradiate the laser beam such that the center of the laser beam for performing the recording and reproducing operations is in conformity with the center of each guide groove 9A of optical disk 9.

Figure 3:
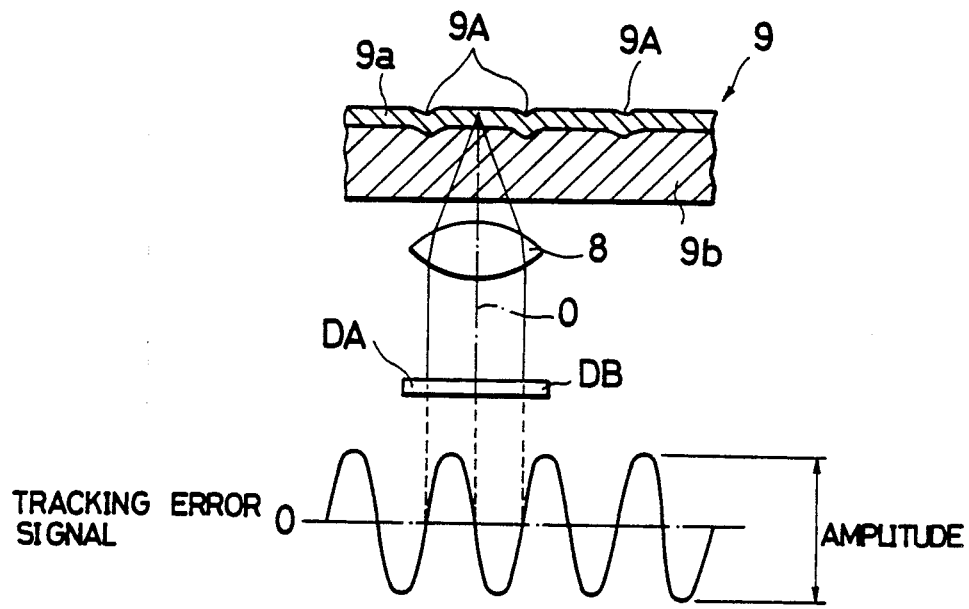
FIG. 3 is a schematically cross-sectional view for explaining the general optical disk.

As shown in FIG. 1, the tracking control of the laser beam is performed by a tracking controller composed of two divided photodiodes DA, DB, adder 10, differential device 11 and rotary mirror driver 12. As schematically shown in FIG. 3, when optical axis O of the laser beam is located in the center of each guide groove pair 9A of optical disk 9, i.e., in the accurate tracking state, the laser beam reflected from optical disk 9 delivers equal amounts of light to two divided photodiodes DA and DB. Therefore, outputs A and B of photodiodes DA and DB are equal to each other so that output A-B of differential device 11 becomes zero. However, in FIG. 3, when optical axis O of the laser beam is shifted in the right and left directions, i.e., in a shifted tracking state, outputs A and B of photodiodes DA and DB are not equal to each other so that output A-B of differential device 11 is not zero. In this case, a tracking error signal is provided to rotary mirror driver 12 to rotate rotary mirror 7. The tracking servo control is performed with respect to this rotary mirror 7 until outputs A and B of two divided photodiodes DA and DB are equal to each other, i.e., no tracking error signal is generated by the shift of optical axis O by the rotation of rotary mirror 7.

A recording signal of optical disk 9 is detected by adding the change in reflected light intensity of the laser beam caused by the existence and non-existence of pits formed in data section 9C to the outputs of two divided photodiodes DA and DB by means of adder 10.

The function of the above-mentioned tracking servo control is influenced by the magnitude of the tracking error signal. Namely, the servo function is improved as the magnitude in amplitude of the tracking error signal is large, as shown in FIG. 3. In a portion of optical disk 9 containing pre-format pits 9B, the amplitude of this tracking error signal tends to be small in comparison with data section 9C. This means that the amplitude of the tracking error signal is changed by the cross-sectional shapes of guide grooves 9A and pre-format pits 9B.

Figure 4:
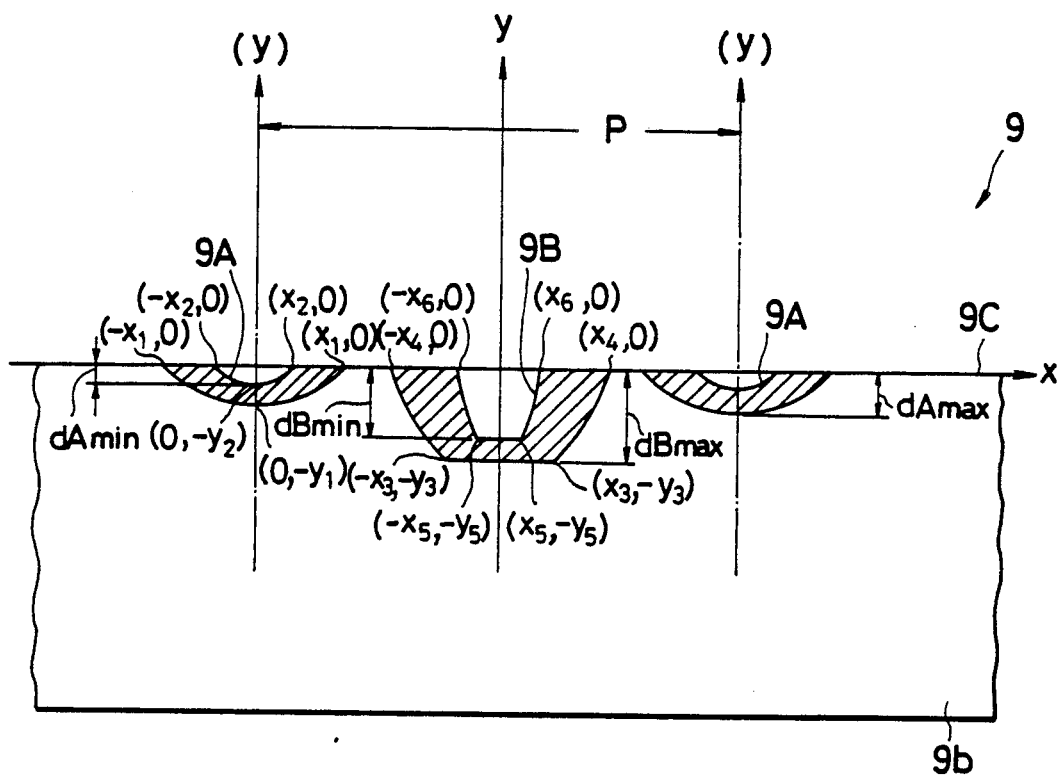
FIG. 4 is an enlarged cross-sectional view of a main portion of an optical type information recording medium in one embodiment of the present invention.

FIG. 4 shows an enlarged portion of optical disk 9 in cross section in the normal direction(radial direction) of optical disk 9 in one embodiment of the present invention.

In FIG. 4, similar to the embodiment of FIG. 2, guide grooves 9A for tracking are disposed on substrate 9b of optical disk 9 and are formed in a concentric or spiral shape. Pre-format pits 9B for recording address information, etc., are formed approximately midway between guide grooves 9A in the normal direction thereof or in the radial direction of the optical disk. Pre-format pits 9B are spaced from each other in the tangential and normal directions of optical disk 9. Each of guide grooves 9A forms a continuous thin stripe approximately along the tangential direction of optical disk 9. Data section 9C for recording information is arranged in a portion of optical disk 9 in which pre-format pits 9B are not formed between two adjacent guide grooves 9A. Depth dA of each guide groove 9A and depth dB of each pre-format pit 9B in single optical disk 9 are uniform. These depths dA and dB are independent of the information recorded to data section 9C, but influence the amplitude of a tracking error signal.

The information recorded to data section 9C is encoded in changes in data section 9C in only the tangential direction. For example, when a video program is recorded to data section 9C, a brightness signal can be coded to a change in spatial frequency in data section 9C, and chromaticity and voice signals can be coded to a change in length of data sectin 9C. The information thus coded is read by an apparatus for performing the recording and reproducing operations as shown in FIG. 1. In order to protect the information from dust, scratches, etc., the information is read by irradiating the laser beam in a transmitting direction of a transparent substrate 9. However, in this case, refractive index n of substrate 9b becomes one factor for specifying the shapes of each guide groove 9A and each pre-format pit 9B. Namely, with respect to substrate 9 in this embodiment, when pitch P between guide grooves 9A is a value represented by inequality 1.4 $\mu$m$\leq$P$\leq$2.0 $\mu$m, and depth dB of pre-format pits 9B is a value represented by equality 0.46$\lambda$/n$\leq$dB$\leq$0.58$\lambda$/n, the amplitude of the tracking error signal becomes a value for enabling the tracking servo control. Here, $\lambda$ is the wavelength(nm in unit) of a light source (laser beam) for reading the information recorded onto optical disk 9.

On the other hand, it is theoretically known that, when depth dB of guide grooves 9A is $\lambda$/8n, the output of the tracking error signal provided by only guide grooves 9A becomes maximum. However, the theoretical cross-sectional shape of guide grooves 9A can be provided only when a wall face of each guide groove is vertical with respect to an upper surface of substrate 9. Accordingly, it is impossible to conveniently manufacture guide grooves 9A having such a shape in an order of nanometer. Further, even if guide grooves having such a rectangular shape could be formed, substrate 9b and an original die (which is called a stamper in the following description) for forming guide grooves 9A therein could not be easily separated from each other when guide grooves 9A are transferred and molded onto substrate 9b from the stamper forming guide grooves 9A, so that there is a possibility that guide grooves 9A could be deformed and damaged.

In accordance with an aspect of the invention concerning a cross-sectional shape of guide groove 9A for easily separating the stamper from the substrate and for providing a tracking error signal for stable tracking servo control, an effective tracking error signal can be provided when the cross-sectional shape of guide groove 9A has a shape in the region shown by hatching in FIG. 4. The amplitude of the tracking error signal is small if the cross-sectional shape of guide groove 9A is outside this region, impeding stable tracking servo control. Accordingly, the cross-sectional shape of guide groove 9A within an effective region thereof is provided in a range represented by the following inequality, $$G_1(x) \leq y \leq G_2(x)$$

where $G_1(x)$ is a function representing the cross-sectional shape of guide groove 9A in the maximum depth $dA_{max}$ and $G_2(x)$ is a function representing the cross-sectional shape of guide groove 9A in the minimum depth $dA_{min}$. Here, (x,y) in the above inequality shows coordinates in which the origin is the center of guide groove 9A on the upper surface of substrate 9b.

Functions $G_1(x)$ and $G_2(x)$ can be respectively represented as portions of specified second degree functions as follows.

With respect to function $G_1(x)$, $g_1(x)$ is a second degree function which has the vertex at coordinates $(0,-y_1)$ of the deepest portion of guide groove 9A having the maximum shape within the above effective region and passes through two coordinates $(x_1,0)$ and $(-x_1,0)$ on the x axis determining the width of guide groove 9A. In this case, when second degree function $g_1(x)\geq 0$, i.e., when the sign of y is positive, function $G_1(x)=0$. When second degree function $g_1(x)\leq 0$, i.e., when the sign of y is negative, function $G_1(x)=g_1(x)$. Function $G_1(x)$ can be represented as such a second degree function. Second degree function $g_1(x)$ is represented by the following formula, $$g_1(x)=((1.5\times 10^{-3})x^2-150)k$$

which is provided on the basis of the actual maximum shape of guide groove 9A where $k=(1.5/780)\times \lambda/n$.

Similarly, with respect to function $G_2(x)$, $g_2(x)$ is a second degree function which has the vertex at coordinates $(0,-y_2)$ of the deepest portion of guide groove 9A having the minimum shape within the above effective region and passes through two coordinates $(x_2,0)$ and $(-x_2,0)$ on the x axis determining the width of guide groove 9A. In this case, when second degree function $g_2(x)\geq 0$, function $G_2(x)=0$. When second degree function $g_2(x)\leq 0$, function $G_2(x)=g_2(x)$. Function $G_2(x)$ can be represented as such a function of the second degree. Second degree function $g_2(x)$ is represented by the following formula, $$g_2(x)=((2.5\times 10^{-3})x^2-60)k.$$

Accordingly, in this embodiment, guide groove 9A has a wall face having a gentle inclination and the depth of guide groove 9A in the deepest portion thereof is 60 k to 150 k(nm), i.e., from $(1/8.7)\times\lambda/n$ to $(1/3.5)\times\lambda/n$. Therefore, a sufficient tracking error signal can be provided, and a stamper and a substrate 9b that easily separate from each other can be manufactured by a normal process for manufacturing the stamper.

As mentioned above, the amplitude of the tracking error signal in the portion of optical disk 9 forming pre-format pit 9B, is small in comparison with that in data section 9C so that it is not easy to perform a stable tracking servo control. Accordingly, the cross-sectional shape of pre-format pit 9B is desirably provided such that the amplitude of the tracking error signal is reduced as much as possible and the pre-format pit is easily manufactured by the normal stamper manufacturing process similar to the case of the above-mentioned guide groove 9A and the stamper and the substrate are easily separated from each other.

In accordance with the invention a cross-sectional shape of pre-format pit 9B satisfying the above-mentioned conditions pre-format pit 9B error signal can be provided when the cross-sectional shape of pre-format pit 9B is a shape formed within the region shown by hatching in FIG. 4.

Accordingly, similar to the case of guide groove 9A, the cross-sectional shape of pre-format pit 9B within the above effective region is provided in a range represented by the following inequality, $$F_1(x)\leq y \leq F_2(x)$$

where $F_1(x)$ is a function representing the cross-sectional shape of pre-format pit 9B in the case of maximum depth $dB_{max}$, and $F_2(x)$ is a function representing the cross-sectional shape of pre-format pit 9B in the case of minimum depth $dB_{min}$. In the above inequality, (x,y) shows coordinates in which the origin is at approximately the middle between guide grooves 9A on the upper surface of substrate 9b, i.e., a point having an allowable error of $\pm 100$ nm with respect to the middle point.

As mentioned above, an effective tracking error signal can be provided when the depth of pre-format pit 9B is from 0.46$\lambda$/n to 0.58$\lambda$/n. When this depth is 0.46λ/n, i.e., minimum depth $dB_{min}$, as shown in FIG. 4, it is necessary to form a definite flat portion in the bottom of pre-format pit 9B. Namely, a tracking error signal for performing a stable tracking operation cannot be provided when the bottom of the pre-format pit is not flat, but only the depth thereof reaches depth 0.46λ/n. Therefore, when the cross-sectional shape of pre-format pit 9B has a width narrower or wider than the groove width in its effective region, or the depth of the pre-format pit exceeds that in the effective region thereof, the tracking error signal is deteriorated or the stamper and the substrate are not easily separated from each other.

Accordingly, similar to the case of guide groove 9A, functions $F_1(x)$ and $F_2(x)$ can be represented as portions of specified second degree functions if these functions $F_1(x)$ and $F_2(x)$ satisfy the above-mentioned conditions. In the following description, $f_1(x)$ is a second degree function which passes through two coordinates $(x_3, -y_3)$ and $(-x_3, -y_3)$ determining the width of the bottom of pre-format pit 9B having its maximum shape within the effective region thereof, and two coordinates $(x_4, 0)$ and $(-x_4, 0)$ on the x axis determining the width of pre-format pit 9B. In this case, function $F_1(x)$ can be represented as a second degree function in which, when $f_1(x) \geq 0$, $F_1(x) = 0$, when $0 \geq f_1(x) \geq -0.58x\lambda/n$, $F_1(x) = f_1(x)$, and when $-0.58x\lambda/n \geq f_1(x)$, $F_1(x) = -0.58x\lambda/n$.

Second degree function $f_1(x)$ can be represented by the following formula, $$f_1(x) = ((3 \times 10^{-3})x^2 - 400)k$$

Similarly, $f_2(x)$ is a second degree function which passes through two coordinates $(x_5, -y_5)$ and $(-x_5, -y_5)$ determining the width of the bottom of pre-format pit 9B having its minimum shape within the effective region thereof, and two coordinates $(x_6, 0)$ and $(-x_6, 0)$ on the x axis determining the width of pre-format pit 9B. In this case, function $F_2(x)$ can be represented as a second degree function in which, when $f_2(x) \geq 0$, $F_2(x) = 0$, when $0 \geq f_2(x) \geq -0.46x\lambda/n$, $F_2(x) = f_2(x)$, and when $-0.46x\lambda/n \geq f_2(x)$, $F_2(x)$ $0.46x\lambda/n$.

Second degree function $f_2(x)$ can be represented by the following formula, $$f_2(x) = ((20 \times 10^{-3}) \times x^2 - 350)k$$

With respect to optical disk 9 having guide groove 9A and pre-format pit 9B formed in shapes satisfying the above-mentioned conditions, the amplitude of the tracking error signal in the portion of optical disk 9 having pre-format pit 9B can reach more than 60% of the amplitude of the tracking error signal in data section 9C. Accordingly, in the optical disk in this embodiment, a stable and accurate tracking operation can be maintained even when there is a disturbance and the reflectance ratio of the optical disk is deteriorated with the passage of time, and the optical axis of the laser beam is shifted, and the face of the optical disk is inclined.

In accordance with the optical type information recording medium of the present invention, the following effects can be obtained.

(1) The tracking operation can be stably performed in the pre-format pit section, and there is less possibility that a tracking shift could occur, thereby improving the reliability of the optical disk system.

(2) Since the cross-sectional shape of the optical disk is very accurately specified, it is possible to judge whether this cross-sectional shape is good or not by a simplified operation such as an overlapping operation of the cross-sectional shape and the shape shown in FIG. 4 for example.

(3) The optical disk can be relatively easily manufactured in a process for manufacturing the stamper by exposing and developing a photoresist on an original glass plate by the laser beam.

(4) The number of kinds of materials usable as a recording film is increased.

(5) The substrate is easily separated from the stamper and the optical disk can be easily transferred by a photopolymer method, an injection method, etc.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical type information recording medium comprising:

guide grooves for tracking formed in a concentric or spiral shape at a predetermined pitch; and a pre-format pit formed approximately midway between the guide grooves for recording at least address information;

said optical type information recording medium being constructed such that said predetermined pitch is from 1.4 μm to 2.0 μm, said pre-format pit has a depth from 0.46λ/n to 0.58λ/n, where n is the refractive index of a substrate of the medium and λ is the wavelength of a light source for reading the information recorded in the medium, said pre-format pit having a cross-sectional shape defined by a first inequality, $$F_1(x) \leq y \leq F_2(x)$$

where x and y in said first inequality are coordinates having an origin located at approximately the midpoint between adjacent guide grooves on a substrate face of the medium, $F_1(x)$ is a function representing the cross-sectional shape of the pre-format pit at a maximum depth in a y-direction and $F_2(x)$ is a function representing the cross-sectional shape of the pre-format pit at a minimum depth in the y-direction; and when $y = f_1(x) = (1.5/780)(\lambda/n)((3 \times 10^{-3})x^2 - 400)$, then $F_1(x) = 0$ when $f_1(x) \geq 0$, $F_1(x) = f_1(x)$ when $0 \geq f_1(x) \geq -0.58\lambda/n$, and $F_1(x) = -0.58\lambda/n$ when $-0.58\lambda/n \geq f_1(x)$;

when $y = f_2(x) = (1.5/780)(\lambda/n)((20 \times 10^{-3})x^2 - 350)$, then $F_2(x) = 0$ when $f_2(x) \geq 0$, $F_2(x) = f_2(x)$ when $0 \geq f_2(x) \geq -0.46\lambda/n$, and $F_2(x) = -0.46\lambda/n$ when $-0.46\lambda/n \geq f_2(x)$;

the cross-sectional shape of said guide grooves is defined by a second inequality, $$G_1(x) \leq y \leq G_2(x)$$

where x and y in said second inequality are coordinates the origin of which is at a center of a guide groove on the substrate face of the medium, $G_1(x)$ is a function representing the cross-sectional shape of the guide grooves at a maximum depth in a y-direction, and $G_2(x)$ a function representing the cross-sectional shape of the guide grooves at a minimum depth in the y-direction, and when $y = g_1(x) = (1.5/780)(\lambda/n)((1.5 \times 10^{-3})x^2 - 150)$, then $G_1(x) = 0$ when $g_1(x) \geq 0$, and $G_1(x) = g_1(x)$ when $g_1(x) \leq 0$; and when $y = g_2(x) = (1.5/780)(\lambda/n)((2.5 \times 10^{-3})x^2 - 60)$, then $G_2(x) = 0$ when $g_2(x) \geq 0$ and $G_2(x) = g_2(x)$ when $g_2(x) \leq 0$.

* * * * *